US012785215B2

(12) United States Patent
Tran et al.

(10) Patent No.: US 12,785,215 B2
(45) **Date of Patent: *Nov. 3, 2026**

(54) PASSIVATION/ENCAPSULATION LAYER, VIA AND DISTRIBUTION LAYER, SOLID-STATE BATTERY INCLUDING THE SAME, AND METHOD(S) OF MAKING THE SAME

(71) Applicant: Ensurge Micropower ASA, Oslo (NO)

(72) Inventors: Khanh Tran, San Jose, CA (US); Mihalis Michael, San Jose, CA (US); Yasumasa Morita, San Jose, CA (US); Shahid Pirzada, San Jose, CA (US); Arvind Kamath, Los Altos, CA (US); Richard van der Linde, San Jose, CA (US)

(73) Assignee: Ensurge Micropower ASA, Oslo (NO)

( * ) Notice: Subject to any disclaimer, the term of this patent is extended or adjusted under 35 U.S.C. 154(b) by 743 days.

This patent is subject to a terminal disclaimer.

(21) Appl. No.: 18/319,532

(22) Filed: May 18, 2023

(65) Prior Publication Data

US 2023/0378606 A1 Nov. 23, 2023

Related U.S. Application Data

(60) Provisional application No. 63/343,522, filed on May 18, 2022.

(51) Int. Cl.
*H01M 10/052* (2010.01)
*H01M 4/131* (2010.01)
(Continued)

(52) U.S. Cl.
CPC ......... *H01M 50/446* (2021.01); *H01M 4/131* (2013.01); *H01M 4/136* (2013.01);
(Continued)

(58) Field of Classification Search
CPC ........... H01M 10/052; H01M 10/0562; H01M 10/058; H01M 10/0585; H01M 6/40; Y02E 60/10
See application file for complete search history.

(56) References Cited

U.S. PATENT DOCUMENTS

2006/0286448 A1* 12/2006 Snyder .................. H01M 4/139 29/623.5
2017/0288272 A1* 10/2017 Kwak ................. H01M 10/052
(Continued)

OTHER PUBLICATIONS

U.S. Appl. No. 18/319,552, "High Energy-Density Solid-State Battery, and Method(S) of Making the Same"; filed May 18, 2023; assigned to Ensurge Micropower ASA.

*Primary Examiner* — Matthew T Martin
*Assistant Examiner* — Cameron M Baird
(74) *Attorney, Agent, or Firm* — Polygon IP, LLP

(57) ABSTRACT

A solid-state battery and methods of making the same are disclosed. The battery includes a plurality of cells and first and second terminals on opposite sides/edges of the battery. Each cell includes a cathode current collector (CCC), a cathode thereon, a solid-state electrolyte, an anode current collector (ACC), a moat in the cathode and the electrolyte and around the ACC, a barrier/insulation film, a via/opening in the barrier/insulation film exposing the ACC, and a conductive redistribution layer in the via/opening, in the moat, on the barrier/insulation film, and on a first sidewall of each cell. The barrier/insulation film encapsulates the CCC, the cathode, the solid-state electrolyte and the ACC. One terminal is electrically connected to each ACC through the redistribution layer, and the other is electrically connected to each cathode or CCC.

20 Claims, 4 Drawing Sheets

(51) Int. Cl.

| | |
|---|---|
| ***H01M 4/136*** | (2010.01) |
| ***H01M 4/66*** | (2006.01) |
| ***H01M 10/0562*** | (2010.01) |
| ***H01M 10/058*** | (2010.01) |
| ***H01M 50/417*** | (2021.01) |
| ***H01M 50/446*** | (2021.01) |
| ***H01M 50/562*** | (2021.01) |

(52) U.S. Cl.

CPC ........... *H01M 4/661* (2013.01); *H01M 4/663* (2013.01); *H01M 10/052* (2013.01); *H01M 10/0562* (2013.01); *H01M 10/058* (2013.01); *H01M 50/417* (2021.01); *H01M 50/562* (2021.01)

(56) References Cited

U.S. PATENT DOCUMENTS

| | | | | |
|---|---|---|---|---|
| 2021/0320324 | A1* | 10/2021 | Wang ...................... | H01M 4/62 |
| 2023/0420731 | A1* | 12/2023 | Tran ...................... | H01M 4/131 |

* cited by examiner

PASSIVATION/ENCAPSULATION LAYER, VIA AND DISTRIBUTION LAYER, SOLID-STATE BATTERY INCLUDING THE SAME, AND METHOD(S) OF MAKING THE SAME

REFERENCE TO RELATED APPLICATIONS

This application claims the benefit of U.S. Provisional Pat. Appl. No. 63/343,522, filed May 18, 2022, incorporated herein by reference in its entirety.

FIELD OF THE INVENTION

The present invention generally relates to the field of solid-state and/or thin film batteries. More specifically, embodiments of the present invention pertain to a passivation/encapsulation layer, via and distribution layer for a solid-state battery, a solid-state battery including the same, and methods of making the passivation/encapsulation layer, via and distribution layer and the battery.

DISCUSSION OF THE BACKGROUND

Solid-state lithium batteries are ionic-charge storage devices that are ideally suited for wearable, IoT, and other non-EV applications due to their small size, safety, and high cyclability. To retain a high cycle life or a long lifetime over repeated charging/discharging cycles, the battery cell should be shielded from ambient ingress to prevent lithium loss due to undesirable reactions (e.g., of elemental lithium with components in air) during charge cycling. At the cell level, one solution is to deposit a protection layer. However, this layer is typically diced or cut during subsequent device singulation, thereby rendering entry paths for ambient ingress on the device sidewalls. Another method is to package the cell inside a pouchcell, or by sandwiching it inside moisture-resistant lamination layers. These assembly methods, however, add packaging overhead, therefore reducing the charge capacity per packaged area and per packaged volume. Thus, an improved solution is needed to provide reasonably robust ambient protection with low packaging overhead.

This "Discussion of the Background" section is provided for background information only. The statements in this "Discussion of the Background" are not an admission that the subject matter disclosed in this "Discussion of the Background" section constitutes prior art to the present disclosure, and no part of this "Discussion of the Background" section may be used as an admission that any part of this application, including this "Discussion of the Background" section, constitutes prior art to the present disclosure.

SUMMARY OF THE INVENTION

The present invention relates to solid-state and thin film batteries, and more specifically to a stacked solid-state battery and method(s) of making the same. In one aspect, the present invention relates to a solid-state battery, comprising a plurality of cells and first and second terminals on opposite sides or edges of the battery. Each of the cells comprises a cathode current collector (CCC), a cathode on the cathode current collector, a solid-state electrolyte on the cathode, an anode current collector (ACC) on the electrolyte, a moat in the cathode and the solid-state electrolyte and around the anode current collector, a barrier and/or insulation film encapsulating the CCC, the cathode, the solid-state electrolyte and the ACC, a via or opening in the barrier and/or insulation film exposing the ACC, and a conductive redistribution layer in the via or opening and on the barrier and/or insulation film. The redistribution layer is also in the moat and on a first sidewall of each cell. One of the first and second terminals on the first side or edge of the battery is electrically connected to each ACC through the redistribution layer on the first sidewall, and the other of the first and second terminals is electrically connected to each cathode or CCC on the second, opposite side or edge of the battery.

In some embodiments, the CCC comprises a metal foil, sheet or film. The metal foil may be in the form of a sheet or roll, and may also function as a mechanical substrate supporting the remainder of the battery cell and/or on which the battery cell may be formed. The metal foil may comprise stainless steel, aluminum, copper, nickel, inconel, brass, molybdenum or titanium, and the aluminum, copper, nickel, molybdenum or titanium may be alloyed with up to 10% of one or more other elements. When the CCC comprises the metal foil, it may further comprise first and second barriers on opposite major surfaces of the metal foil, the first and second barriers having a thickness effective to prevent migration of atoms or ions from the metal foil into overlying layers. Alternatively, the metal foil, sheet or film may have a single barrier on a major surface thereof, having a thickness effective to prevent migration of atoms or ions from the metal foil, sheet or film into overlying layers. The barrier(s) may comprise a glass, a ceramic, or a conductive, amorphous material.

In various embodiments, the cathode may comprise a lithium metal oxide or lithium metal phosphate. For example, the cathode may comprise lithium cobalt oxide ($LiCoO_2$), lithium manganese oxide ($LiMn_2O_4$), or lithium iron phosphate ($LiFePO_4$).

In other or further embodiments, the solid-state electrolyte may comprise a lithium phosphorus oxynitride (LiPON) or $Li_2WO_4$. Optionally, the LiPON electrolyte may be carbon-doped.

In yet other or further embodiments, the anode current collector may comprise a conductive metal or graphite. For example, the anode current collector may comprise nickel, zinc, copper, or an alloy thereof. In various implementations, the anode current collector has a thickness of 0.1-5 μm, and area dimensions that are 50-90% of corresponding length and width dimensions, respectively, of the corresponding cell.

In various embodiments, the moat may comprise a cut through the cathode and the solid-state electrolyte, and optionally, into the cathode current collector. Ideally, the moat completely surrounds the ACC. In various examples, the moat may have a width of 3-20 μm.

In other or further embodiments, the barrier and/or insulation film may comprise a polyolefin. Optionally, the barrier and/or insulation film may have an inorganic oxide or nitride overlayer thereon. For example, the polyolefin may comprise parylene, polyethylene or polypropylene, and the overlayer may comprise $Al_2O_3$, $SiO_2$ or $Si_3N_4$. Alternatively, the barrier/insulation film may have a polycarbonate or amorphous carbon coating thereon.

In various embodiments, the redistribution layer may comprise an air- and/or water-stable metal. For example, the redistribution layer may comprise Cu, Ni, or Al.

In other or further embodiments, the first and second terminals may comprise a conductive epoxy. For example, the conductive epoxy may comprise an Ag-filled or Ni-filled conductive epoxy paste. Alternatively, the first and second terminals comprise a noble metal such as Au, Pt, Pd or Cu, either in the conductive epoxy, or plated onto the redistribution layer and/or exposed edges of the CCC and/or cathode.

In some embodiments, the present solid-state battery may further comprise a dummy cell on an uppermost surface of a stack of the plurality of cells. The dummy cell may comprise a metal foil substrate (e.g., identical to that of the CCC, when the CCC comprises a metal foil) encapsulated with an encapsulant. The encapsulant may be identical to the barrier and/or insulation film. The dummy cell is generally configured to protect the stack of battery cells from externally-caused damage and to provide a barrier to ingress of moisture and air (e.g., into the active region[s] of the battery cells).

The present invention also relates to a method of making a solid-state battery cell, comprising forming a cathode on a substrate, forming a solid-state electrolyte on or over the cathode, forming an anode current collector on or over the solid-state electrolyte, forming a moat in the cathode and the solid-state electrolyte and around the anode current collector, encapsulating the substrate, the cathode, the solid-state electrolyte, and the anode current collector with an encapsulation (e.g., that is essentially the same as the barrier and/or insulation film in the present solid-state battery), forming an opening in the encapsulation exposing the anode current collector, and forming a conductive redistribution layer on the exposed anode current collector, on the encapsulation, in the moat, and on a first sidewall of the solid-state battery cell.

Similar to the present solid-state battery, the substrate may comprise a metal foil, sheet or film that can also function as a cathode current collector. When the substrate comprises the metal foil, the method may further comprise forming a barrier on a major surface of the metal foil. The barrier generally has a thickness effective to prevent migration of atoms or ions from the metal foil into overlying layers. The barrier may comprise a glass, a ceramic, or a conductive, amorphous material.

In various embodiments, the cathode may be formed by blanket deposition and patterning. For example, blanket deposition may comprise laser deposition (e.g., pulsed laser deposition [PLD]), sputtering, chemical vapor deposition (CVD), sol-gel processing, etc. Alternatively, the cathode may be formed by selective deposition. Selective deposition may comprise screen printing, inkjet printing, spray coating, or extrusion coating (e.g., using an ink comprising one or more sol-gel precursors and one or more solvents, having a viscosity appropriate for the printing or coating technique).

In other or further embodiments, forming the electrolyte may comprise depositing a lithium phosphorus oxynitride (LiPON) layer or a tungsten oxide layer of the formula $WO_{3+x}$ ($0 \le x \le 1$). The LiPON layer may be deposited by RF sputtering or atomic layer deposition (ALD). The tungsten oxide layer may be deposited by sputtering, optionally using pulsed DC power, in an oxygen or oxygen-containing atmosphere. In embodiments in which the electrolyte comprises the tungsten oxide layer, forming the electrolyte may further comprise lithiating and thermally annealing the $WO_{3+x}$. Lithiating may comprise wet lithiation or dry lithiation. Thermal annealing may comprise heating at a temperature of 150-500° C. for a length of time of 5-240 minutes in a conventional oven, a vacuum oven, or a furnace.

In certain embodiments, forming the cathode and forming the solid-state electrolyte may comprise blanket-depositing the cathode as a first layer and blanket-depositing the solid-state electrolyte as a second layer.

In some embodiments, forming the anode current collector may comprise selectively depositing the anode current collector in a predetermined area of the solid-state electrolyte. For example, selectively depositing the anode current collector may comprise screen printing, inkjet printing, or spray coating the anode current collector.

In various embodiments, the moat may have a width of 3-20 μm and may be formed by laser ablation, mechanical dicing, or low-resolution photolithographic patterning and etching.

In other or further embodiments, the encapsulation covers all front, back and exposed side surfaces of all cells. In various examples, the encapsulation may be formed by pyrolysis, thermal CVD, ALD, inkjet printing, or screen printing. The via or opening may be formed by (i) laser ablation or (ii) photolithographic masking and etching, for example.

In various embodiments, forming the redistribution layer may comprise sputtering, thermally evaporating, or blanket-depositing the redistribution layer, photolithographically patterning a photoresist on the redistribution layer, and etching the redistribution layer. However, instead of sputtering, thermally evaporating, or blanket-depositing the redistribution layer, the redistribution layer may be deposited by ALD. Alternatively, forming the redistribution layer may comprise selectively depositing the redistribution layer, such as by inkjet printing, aerosol-jet printing or screen printing. As for the present solid-state battery, the redistribution layer comprises an air- and/or water-stable metal. For example, the air- and/or water-stable metal may comprise Cu, Ni or Al.

A further aspect of the present method concerns making a stacked solid-state battery. Such a method may comprise conducting the present method of making the solid-state battery cell a plurality of times (simultaneously and/or in sequence) to form a plurality of the battery cells, stacking a subset of the plurality of the battery cells so that the first sidewall of each of the plurality of battery cells is on a first side of a resulting stack of the battery cells, and depositing a conductor on each of the first side and a second, opposite side of the resulting stack to form first and second terminals of the stacked solid-state battery.

In most embodiments, the plurality of battery cells forms an array of the battery cells (e.g., having a plurality of rows and/or a plurality of columns), and the method may further comprise, before encapsulating the substrate, the cathode, the solid-state electrolyte, and the anode current collector, cutting or dicing the array to form columns or rows of isolated battery cell pairs having sidewalls that fully expose the cathode, the substrate, the solid-state electrolyte, and the encapsulation. Such embodiments may further comprise singulating the cells in the columns or rows of isolated cell pairs. For example, singulating the cells may comprise laser dicing, mechanical dicing or stamping (e.g., the array or the columns or rows of isolated cell pairs, in spaces between adjacent ones of the battery cells).

In various embodiments, stacking the subset of the plurality of the battery cells may form a multi-layer set of parallel cells with edges of the CCCs along the first side of the resulting stack, and the redistribution layers along the second, opposite side of the resulting stack. In other or further embodiments, the method may further comprise placing a dummy cell (as described for the present solid-state battery) on an uppermost surface of the resulting stack. Thus, the dummy cell may comprise a metal foil substrate encapsulated with an encapsulant, as described herein, and the dummy cell may be configured to protect the resulting stack from externally-caused damage and/or to provide a barrier to ingress of moisture and air.

The multi-cell architecture and method allow for high flexibility in customizing for specific three-dimensional (x-y-z) form factors. The capabilities and advantages of the present invention will become readily apparent from the detailed description of various embodiments below.

DETAILED DESCRIPTION

Figures 1, 2, 3:
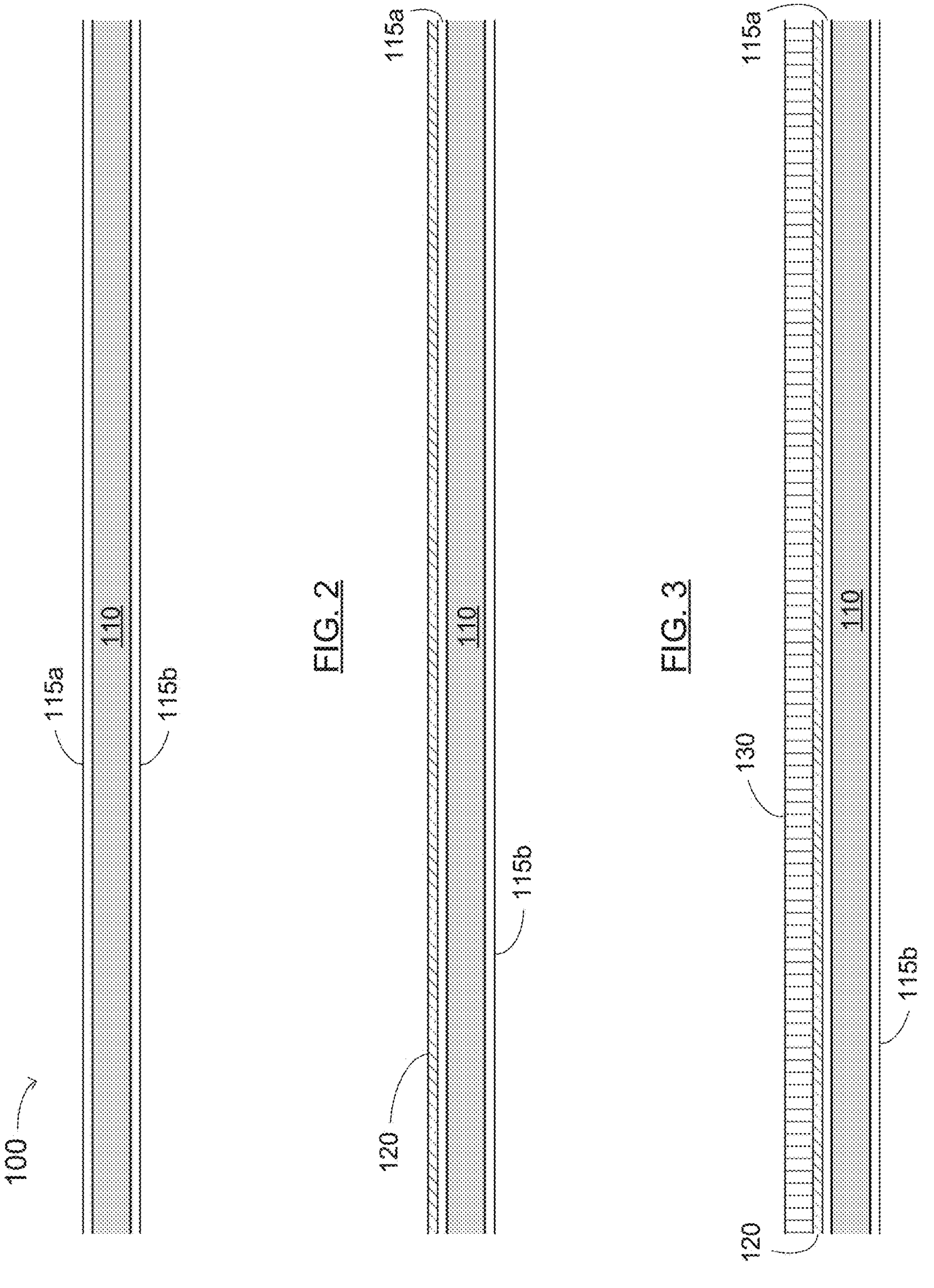
FIGS. 1-9 are cross-sectional views of intermediate structures in an exemplary process of manufacturing a solid-state battery.

Reference will now be made in detail to various embodiments of the invention, examples of which are illustrated in the accompanying drawings. While the invention will be described in conjunction with the following embodiments, it will be understood that the descriptions are not intended to limit the invention to these embodiments. On the contrary, the invention is intended to cover alternatives, modifications and equivalents that may be included within the spirit and scope of the invention. Furthermore, in the following detailed description, numerous specific details are set forth in order to provide a thorough understanding of the present invention. However, it will be readily apparent to one skilled in the art that the present invention may be practiced without these specific details. In other instances, well-known methods, procedures and components have not been described in detail so as not to unnecessarily obscure aspects of the present invention. Furthermore, it should be understood that the possible permutations and combinations described herein are not meant to limit the invention. Specifically, variations that are not inconsistent may be mixed and matched as desired.

The technical proposal(s) of embodiments of the present invention will be fully and clearly described in conjunction with the drawings in the following embodiments. It will be understood that the descriptions are not intended to limit the invention to these embodiments. Based on the described embodiments of the present invention, other embodiments can be obtained by one skilled in the art without creative contribution and are in the scope of legal protection given to the present invention.

Furthermore, all characteristics, measures or processes disclosed in this document, except characteristics and/or processes that are mutually exclusive, can be combined in any manner and in any combination possible. Any characteristic disclosed in the present specification, claims, Abstract and Figures can be replaced by other equivalent characteristics or characteristics with similar objectives, purposes and/or functions, unless specified otherwise.

For the sake of convenience and simplicity, the term "length" generally refers to the largest dimension of a given 3-dimensional structure or feature. The term "width" generally refers to the second largest dimension of a given 3-dimensional structure or feature. The term "thickness" generally refers to a smallest dimension of a given 3-dimensional structure or feature. The length and the width, or the width and the thickness, may be the same in some cases. A "major surface" refers to a surface defined by the two largest dimensions of a given structure or feature, which in the case of a structure or feature having a circular surface, may be defined by the radius of the circle.

In addition, for convenience and simplicity, the terms "part," "portion," and "region" may be used interchangeably but these terms are also generally given their art-recognized meanings. Also, unless indicated otherwise from the context of its use herein, the terms "known," "fixed," "given," "certain" and "predetermined" generally refer to a value, quantity, parameter, constraint, condition, state, process, procedure, method, practice, or combination thereof that is, in theory, variable, but is typically set in advance and not varied thereafter when in use.

The present invention concerns a solid-state battery cell, a stacked solid-state battery, and methods of making the same. The present solid-state battery cell is an intrinsic anode-less battery, including a substrate, a cathode on the substrate, a solid-state electrolyte (SSE) on the cathode, and an anode current collector (ACC) on the SSE. The substrate, which generally comprises a metal foil, serves as the cathode current collector (CCC). Due to its anode-less nature, a conventional lithium anode may not be present between the SSE and ACC.

The following discussion provides examples of solid-state and/or thin film batteries, stacked solid-state batteries, and general manufacturing processes for such batteries.

An Exemplary Method of Making a Solid-State Battery Stack

FIGS. 1-10 show intermediate and final structures in an exemplary method of making a stacked solid-state battery. FIG. 1 shows a substrate 100, comprising a metal foil, sheet or film 110 and optional first and second barriers 115*a-b* on opposite major surfaces of the metal foil, sheet or film 110. When the foil, sheet or film 110 is a metal foil, the first and second barriers 115*a-b* are not optional. The metal foil may comprise or consist essentially of stainless steel, aluminum, copper, nickel, inconel, brass, molybdenum or titanium, the elemental metals of which may be alloyed with up to 10% of one or more other elements to improve one or more physical and/or chemical properties thereof (e.g., oxygen and/or water permeability, flexibility, resistance to corrosion or chemical attack during subsequent processing, etc.). However, the sheet or film can also be a metal sheet or metal roll. For example, the sheet or film may be 10-100 μm thick, whereas a metal sheet may have a thickness of >100 μm, up to about 1-2 mm, although the invention is not so limited. Other alternative substrates include a metal coating on a mechanical substrate, such as aluminum, copper, nickel, titanium, etc., on a removable plastic film, sheet or roll.

The barrier 115*a-b* comprises one or more layers of one or more materials in a thickness effective to prevent migration of atoms or ions from the metal foil, sheet or film 110 into overlying layers. The barrier material(s) may comprise a glass or ceramic, such as silicon dioxide, aluminum oxide, silicon nitride, a silicon and/or aluminum oxynitride, etc., or a (refractory) metal nitride, such as aluminum nitride, titanium nitride, titanium aluminum nitride, tungsten nitride, titanium tungsten nitride, TiW alloy, tantalum nitride, etc. In some embodiments, each of the first and second barriers 115*a-b* comprises alternating glass/ceramic and metal nitride layers (e.g., a first metal nitride layer, a first glass/ceramic layer, and a second metal nitride layer, which may further comprise a second glass/ceramic layer, a third metal nitride layer, etc.). Each barrier 115*a* or 115*b* may have a total thickness of 0.5-3 μm, but the barrier 115 is not limited to this range. The barriers 115*a-b* may be blanket-deposited onto the foil, sheet or film 110 by chemical or physical vapor deposition (e.g., sputtering, thermal evaporation, atomic layer deposition [ALD], etc.), solution-phase coating with a precursor material followed by annealing to form the glass/ceramic or metal nitride, etc. Exemplary barrier materials, structures and thicknesses and methods for their deposition are disclosed in U.S. Pat. No. 9,299,845 and U.S. patent application Ser. No. 16/659,871, filed Oct. 22, 2019, the relevant portions of each of which are incorporated by reference herein.

In some embodiments, the foil, sheet or film 110 functions as a cathode current collector. In such embodiments, at least the barrier 115*a* (and optionally the barrier 115*b*) is a conductive, amorphous material, such as the metal nitrides listed above or an amorphous metal alloy (e.g., a TiW alloy).

FIG. 2 shows the metal substrate 100 with a cathode 120 thereon. The cathode 120 may comprise a lithium metal oxide or lithium metal phosphate, such as lithium cobalt oxide ($LiCoO_2$; LCO), lithium manganese oxide ($LiMn_2O_4$; LMO), or lithium iron phosphate ($LiFePO_4$; LFP), for example. The cathode 120 may be blanket deposited by laser deposition (e.g., pulsed laser deposition or PLD), sputtering, chemical vapor deposition (CVD), sol-gel processing, etc. Alternatively, the cathode 120 may be selectively deposited by screen printing, inkjet printing, spray coating, or extrusion coating (e.g., using an ink comprising one or more sol-gel precursors and one or more solvents, having a viscosity appropriate for the printing or coating technique).

FIG. 3 shows a solid-state electrolyte 130 on the cathode 120. The electrolyte 130 may comprise or consist essentially of a conventional lithium phosphorus oxynitride (LiPON), which may optionally be carbon-doped, or $Li_2WO_4$, a good Li-ion conductor. In some embodiments, the electrolyte 130 may further comprise optional cathode and/or anode interface layers (not shown), each of which may comprise a lithiated metal oxide (see, e.g., U.S. patent application Ser. No. 17/185,111, filed Feb. 25, 2021, the relevant portions of which are incorporated herein by reference).

Forming the electrolyte 140 may comprise depositing a LiPON layer or a tungsten oxide layer of the formula $WO_{3+x}$ ($0 \leq x \leq 1$) by sputtering, optionally using pulsed DC power. When the electrolyte 130 comprises LiPON, it may be deposited by RF sputtering or ALD. The sputtering target may comprise a $Li_3PO_4$ or mixed graphite-$Li_3PO_4$ target, the latter of which may contain 1-15 wt % of graphite, when the electrolyte 130 comprises LiPON or carbon-doped LiPON, and a metallic/elemental tungsten target when the electrolyte 130 comprises a tungsten oxide. In the latter case, sputtering is performed in an oxygen or oxygen-containing atmosphere. The method of making the electrolyte 130 may further comprise lithiating and thermally annealing the $WO_{3+x}$, which can transform it into $Li_2WO_4$, a good Li-ion conductor. Lithiating may comprise wet lithiation (e.g., immersing the $WO_{3+x}$ in a solution containing a lithium electrolyte such as $LiClO_4$, $LiPF_6$, $LiBF_4$, etc., and applying an appropriate electric field) or dry lithiation (e.g., sputtering or thermally evaporating elemental lithium onto the tungsten oxide in a vacuum chamber, optionally while heating the substrate 100). Thermal annealing may comprise heating at a temperature of 150-500° C. for a length of time of 5-240 minutes, or any temperature or length of time therein (e.g., 250-450° C. for 10-120 minutes), in a conventional oven, a vacuum oven, or a furnace. To ensure substantially complete diffusion of the lithium into and/or throughout the $WO_{3+x}$, the $WO_{3+x}$ should be annealed (preferably in air) at a temperature of at least 100° C. for at least 10 minutes (e.g., to transform it into $Li_2WO_4$).

Figure 4:
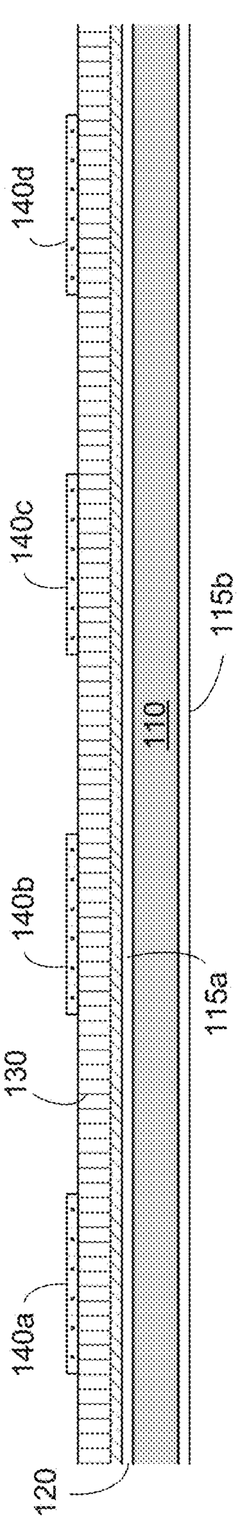
Figure 5:
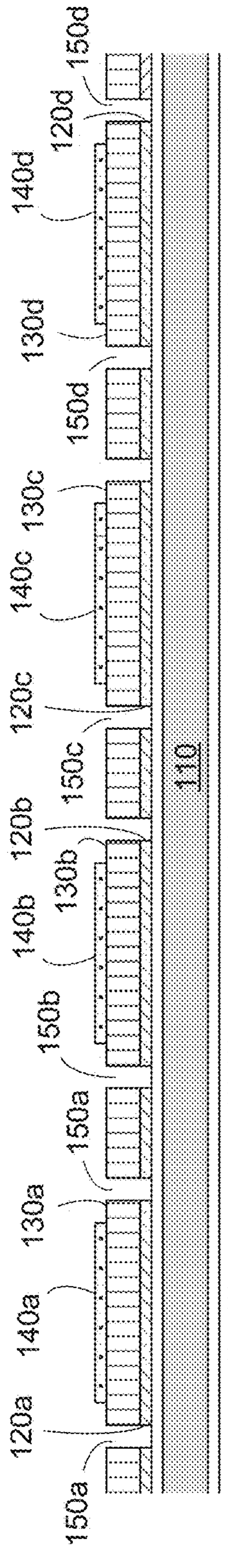

FIG. 4 shows a number of anode current collectors (ACCs) 140*a-d* on the electrolyte 130, thus forming substantially complete (but unsealed) cells. A separately-formed anode is not necessary in solid-state lithium batteries, as a lithium anode can be formed between the electrolyte 130 and the anode current collectors 140*a-d* during charging, if necessary. Optionally, however, a thin lithium anode can be deposited by evaporation onto the electrolyte 130 prior to formation of the anode current collectors 140*a-d*.

The anode current collectors 140*a-d* generally comprise a conductive metal, such as nickel, zinc, copper, alloys thereof (e.g., NiV), etc., or another conductor, such as graphite. The anode current collectors 140*a-d* can be selectively deposited by screen printing, inkjet printing, spray coating, etc., or formed by blanket deposition (e.g., sputtering or evaporation) and patterning (e.g., low-resolution photolithography, development and etching). The anode current collectors 140*a-d* may have a thickness of 0.1-5 μm, although it is not limited to this range.

The anode current collectors 140*a-d* may have area dimensions (i.e., length and width dimensions) that are 50-90% of the corresponding length and width dimensions, respectively, of the cell (see e.g., FIG. 9), although the borders of the anode current collectors 140*a-d* may be offset (pulled back) a minimal distance from the ultimate cell borders, in some embodiments. The pull-back distance of the ACCs 140*a-d* from the cell edges should be sufficient to electrically isolate the ACCs 140*a-d* from the CCC/substrate 100. Formation of the anode current collectors 140*a-d* substantially completes formation of the active cells, except for routing the current at/on the anode current collectors 140*a-d* to a battery terminal.

The cells may further include one or more interlayers that modify the interfaces between layers. For example, a metal oxide (e.g., $Nb_2O_5$, $Al_2O_3$, $Li_4Ti_5O_{12}$ or $LiNbO_3$) interlayer may be formed on the cathode 120 prior to deposition of the electrolyte 130 (e.g., to reduce interfacial stress, decrease interfacial resistance, or suppress formation of a space charge layer). An amorphous (e.g., elemental silicon) interlayer may be deposited on the electrolyte 130 prior to formation of the anode current collectors 140*a-d* to inhibit reduction of the electrolyte. Of course, the battery cell can be made in the reverse order (i.e., the anode current collector may be first formed on the substrate, then the remaining layers deposited in reverse order thereon).

An advantage of the present method is that some/all of the active battery layers (e.g., the cathode 120 and the solid-state electrolyte 130) are deposited as blanket layers. This maximizes the active area utilization of the battery cells for high intrinsic capacity, and also results in a topographically planar or "flat" cell to facilitate formation of the uppermost layer(s) and downstream packaging due to the pattern-free blanket-deposited layers. However, if necessary or desired, the cathode 120 and the SSE 130 can be slightly pulled back from the cell edge by subtractive patterning (e.g., low-resolution photolithography, laser ablation) or selective deposition (as described herein).

FIGS. 5-9 show intermediate structures in a process for moat formation, ACC-edge electrical isolation and cell encapsulation, followed by formation of an interconnect/via and redistribution layer for contact with the anode current collector 140. After cell fabrication as described above, FIG. 5 shows the devices receiving a shallow cut through both of the cathode 120 and the solid-state electrolyte 130 (and optionally slightly into the substrate 100) outside of the ACCs 140*a-d* to form moats 150*a-d* that completely surround the respective ACCs 140*a-d*. The moats 150*a-d* may be formed by laser ablation, mechanical dicing, or low-resolution photolithographic patterning (e.g., of a photoresist or other mask) and etching. The moats 150*a-d* may have a width of 3-20 μm, although the invention is not limited to such widths. The moats 150*a-d* provide an anchoring feature for cell encapsulation (see the discussion below with regard to FIG. 7) and physically separate the active portion(s) of the battery layers from a peripheral dummy region. When the moats 150*a-d* extend into the substrate 100, they fully isolate the active cathode and electrolyte layers 120 and 130. Each of these aspects of the moats 150*a-d* increases resistance to ambient ingress.

Figure 6:
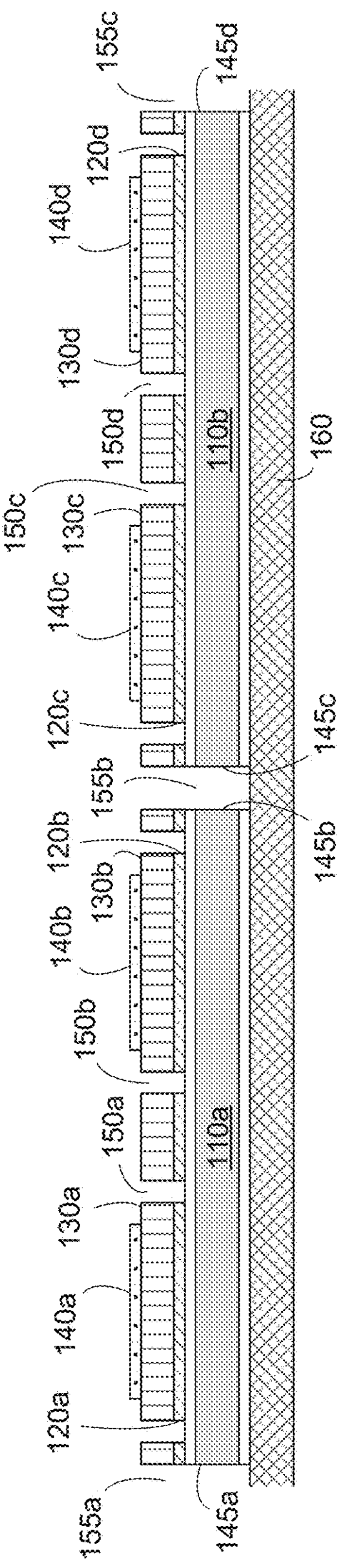

Referring to FIG. 6, the substrate 100 is attached to a tape or sheet 160, and the electrolyte 130, the cathode 120 and the substrate 100 are cut or diced along the "ACC edges" 145*a-d* of the battery cells to form an opening 155*a-c* every other cell, or every other row or column of cells (when the cells are in an array or on a multi-column roll). The tape or sheet 160 is generally a UV release tape or sheet, containing an adhesive on one or both major surfaces that loses its adhesive properties upon sufficient irradiation with ultraviolet (UV) light. The tape or sheet 160 may be on a ring or other frame, configured to mechanically support the tape or sheet 160 and allow some tension therein. The ACC cell edges 145*a-d* are cut by laser (e.g., laser ablation), mechanical dicing or stamping, for example. When the cells are in an array or on a multi-column roll, they may also be cut or diced along the x-direction in FIG. 6 between adjacent cells (e.g., every column, or every row) to form isolated cell pairs. The sidewalls 145*a-d* along the cuts fully expose the entire cell stack, including the CCC/substrate 110. The CCC/substrate 110 is electrically passivated (FIG. 7) prior to formation of the ACC redistribution traces 185*a-c* (FIG. 8) along the sidewalls 145*a-d*, for electrical connection to the ACCs 140*a*-through laser vias 180*a-d*.

Figure 7:
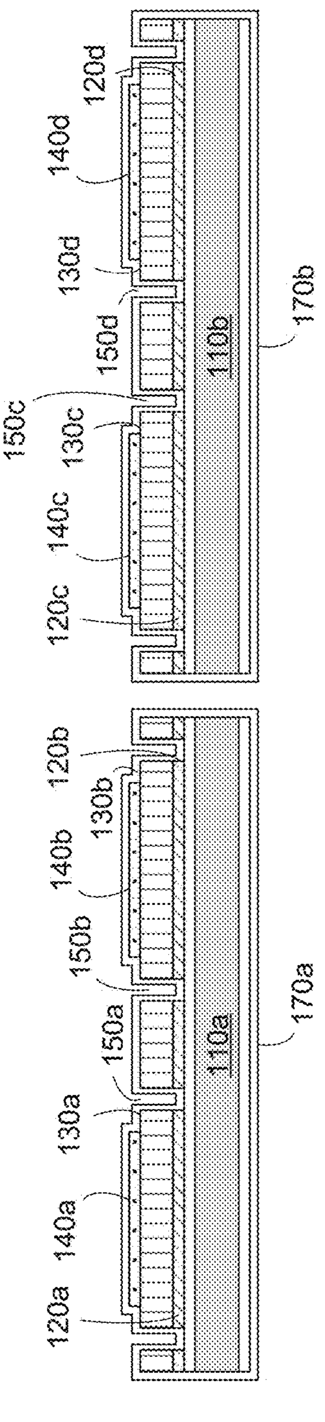

Referring now to FIG. 7, after the diced cell pairs are released from the tape or sheet 160, the cell pairs are encapsulated with a mechanically compliant moisture barrier and electrical insulation film 170*a-b*. The barrier/insulation film 170*a-b* also lines the inner surfaces of the moats 150*a-d* to provide further electrical isolation and moisture barriers to protect the battery cells. The barrier/insulation film 170*a-b* may comprise parylene, polyethylene, polypropylene, or another polyolefin, with or without a thin inorganic oxide or nitride overlayer such as $Al_2O_3$, $SiO_2$ or $Si_3N_4$ (e.g., a parylene/$Al_2O_3$ bilayer). Additionally, the barrier/insulation film 170*a-b* may be coated with a polycarbonate or a diamond-like (e.g., amorphous carbon) coating for additional mechanical protection. The barrier/insulation film 170*a-b* covers all front, back and side surfaces of all cells, and may be formed by pyrolysis, thermal CVD, ALD, inkjet printing, or screen printing.

Figure 8:
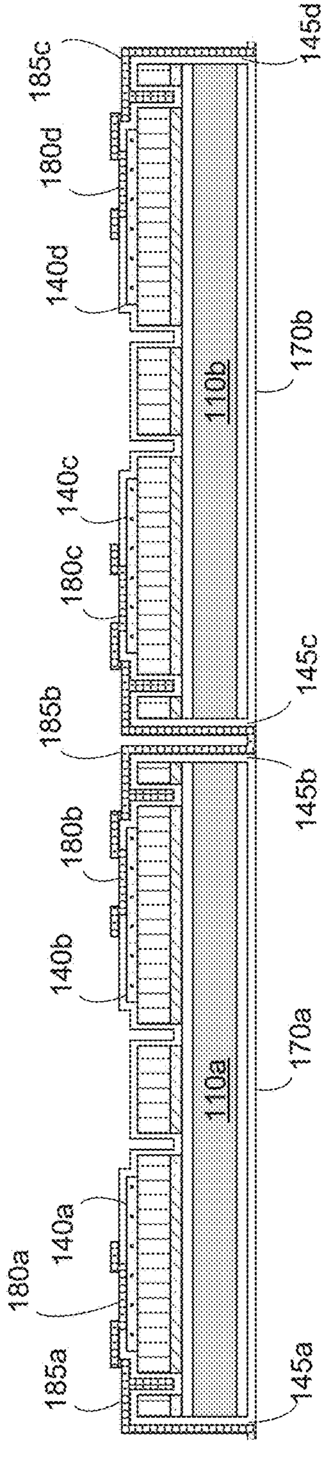

FIG. 8 shows formation of redistribution metal layers 185*a-c* along the ACC edges 145*a-d* and in vias or openings 180*a-d* in the barrier/insulation films 170*a-b* to connect the ACCs 140*a-d* to a subsequently formed external battery terminal. The vias or openings 180*a-d* may be formed in the barrier/insulation films 170*a-b* by (i) laser ablation or (ii) photolithographic masking and etching. Alternatively, the vias or openings 180*a-d* may be formed by patterned encapsulation/deposition of the material(s) for the barrier/insulation films 170*a-b* on the upper surface of the cells, or by physical masking/unmasking using dispensable or preformed adhesives or magnets. The redistribution layers 185*a-c* may comprise Cu, Ni, Al, or another suitable and/or stable (e.g., air- and/or water-stable) metal, and may be formed by sputtering, ALD or thermal evaporation (e.g., through a mask that exposes a region of the cell corresponding to the pattern of the redistribution layers 185*a-c*, followed by removal of the mask, or by blanket deposition, followed by photolithographic patterning and etching), or by selective deposition, such as inkjet printing, aerosol-jet printing or screen printing. A single redistribution layer (e.g., 185*b*) is on the ACC edges 145*a-d* of adjacent cells. The redistribution layers (or ACC redistribution traces) 185*a-c* go from the ACCs 140*a-d* exposed through the vias or openings 180*a-d* to the ACC edges 145*a-d*, in the opposite direction from the CCC edges 125 (FIG. 9).

The ACC redistribution traces 185*a-c* electrically contact the ACCs 140*a-d* through the vias 180*a-d*, but are physically and electrically insulated from the CCCs/substrates 110*a-b* by the barrier/insulation films 170*a-b*. When the ACC redistribution traces 185*a-c* are a metal, they form an intrinsic barrier to ambient ingress in the region of the vias or openings 180*a-d*. The ACC redistribution traces 185*a-c* are both physically on the top surface of the cell and covering at least part of the corresponding sidewalls 145*a-d*. The ACC redistribution traces 185*a-c* on the sidewalls 145*a-d* enable electrical connection to the cells through a terminal on the side of the battery at a later stage of the method.

Figure 9:
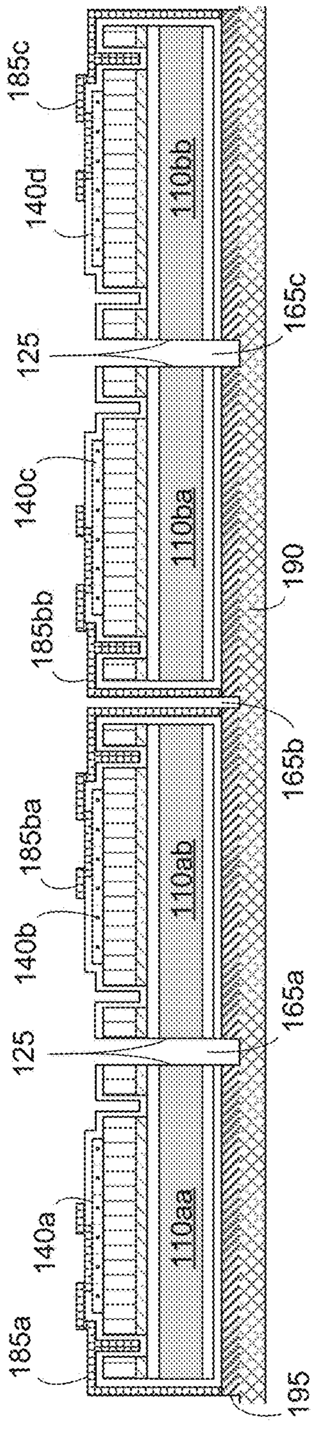

FIG. 9 shows singulated cells on substrates 110*aa*, 110*ab*, 110*ba* and 110*bb*. Prior to singulation (dicing), the cell pairs are placed on an epoxy-coated tape 190/195. In this case, dicing along the CCC edges 125 (to form openings 165*a-c*) creates the single cells. The epoxy coating 195 on the tape 190 holds the cells together during stacking (FIG. 10), and may provide a passivation/sealing layer on one side or surface of the stacked cells during packaging. Thus, the coated tape 190/195 may comprise a die attach film (DAF). Singulation may be conducted by laser dicing, but mechanical dicing and stamping are also possible. Thus, the epoxy coating 195 may also be cut during singulation, as may the tape 190. The redistribution layer 185*b* (FIG. 8) is cut or separated to form redistribution layers 185*ba* and 185*bb* either during singulation or during removal (e.g., from a chuck or other deposition/patterning apparatus) at or near the end of the redistribution layer formation process.

Figure 10:
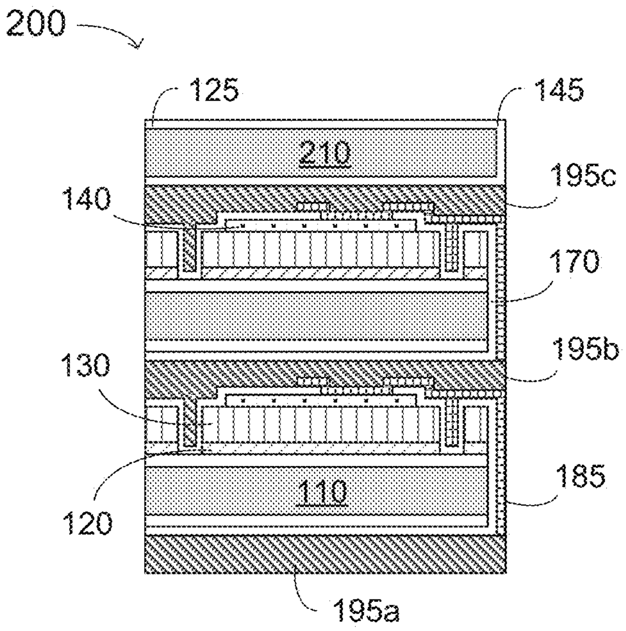
FIG. 10 is a cross-sectional view of an exemplary stacked solid-state battery, according to embodiments of the present invention.

As shown in FIG. 10, after removal of the cells from the tape 190, stacking forms a multi-layer set of parallel cells 200 with the CCC (substrate) edges 125 along one side of the stack, and the ACC edges 145*a-d* (including the ACC trace/redistribution layers 185) along the opposite side. The epoxy adhesion 195*b-c* between cells can be from the coated tape 190/195 (FIG. 9) or from a liquid die attach (DA) process, and can be applied to the back and/or front major surface of the cells, prior to or after cell singulation. If not applied as part of a DAF, the epoxy 195*a-c* can be applied by well-known methods such as b-stage laminated film formation, dispensing, jetting, inkjet printing, screen printing, etc. The stacked set of cells 200 forms a stacked solid-state battery. The parallel cells each additively contribute to the overall battery capacity.

Cell stacking may comprise a conventional pick-and-place technique. However, other stacking methods, such as strip folding, strip stacking, etc. (see, e.g., U.S. patent application Ser. No. 17/185,122, filed Feb. 25, 2021, the relevant portions of which are incorporated herein by reference), before or after dicing are also acceptable. A dummy cell 210 (e.g., a metal foil substrate encapsulated as described with respect to FIG. 7) may be placed on top of the stack 200 as a moisture and air barrier and to protect the stack 200 from externally-caused damage. Optionally, markings on one major surface of the dummy cell 210 can be used as external product markings.

Figure 11:
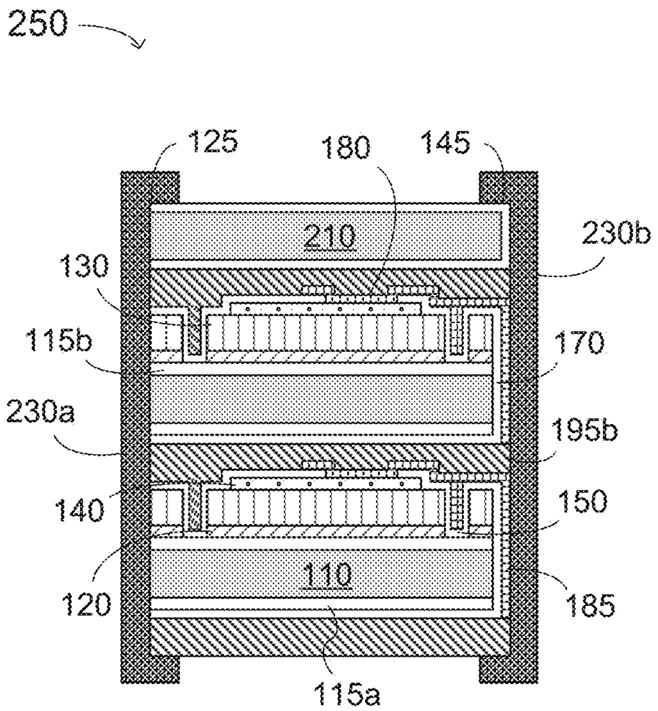
FIG. 11 is a cross-sectional view of an exemplary packaged/sealed stacked solid-state battery, according to embodiments of the present invention.

Battery terminal dipping and plating the stacked set of cells 200 forms external electrical contacts 230*a-b*, as shown in FIG. 11. End terminals at the CCC and ACC edges 125 and 145 (e.g., the exposed edges of the CCCs 110 and the redistribution layers 185, respectively) are dipped into or coated with a conductive epoxy to electrically gang the terminals and form the CCC terminal 230*a* and ACC terminal 230*b* of the packaged battery. The conductive epoxy may comprise an Ag-filled or Ni-filled conductive epoxy paste. Alternatively, a pin-to-pin paste transfer method may be used, or a stable and/or noble metal such as Au, Pt, Pd or Cu can be used in place of the Ag or Ni. Plating part or all of the CCC terminal 230*a* and ACC terminal 230*b* creates a solderable surface for PCB attachment by the end user. For solderable termination, the epoxy surface may be plated with Ni, Ag, In, Sn, or a combination thereof (e.g., Ni, then with In or Sn).

In some embodiments, the conductive epoxy 230*a-b* contains a relatively high metal content, which can retard ambient ingress (e.g., of oxygen or water vapor). The epoxy 230*a-b* may be plated with one or more pure metal layers, to further block ambient ingress. Both of these features help with ambient air resistance, particularly on the CCC edge 125, due to the barrier/insulation film 170 being diced at this edge during cell singulation from the cell pairs (FIG. 9).

An Exemplary Stacked Solid-State Battery

FIG. 11 shows a cross-section of an exemplary stacked solid-state battery 250. The battery 250 includes a plurality of cells, each comprising a cathode current collector 110, a cathode 120 (e.g., LCO) on the cathode current collector (CCC) 110, a solid electrolyte 130 on the cathode 120, an anode current collector (ACC) 140 on the electrolyte 130, a moat 150 in the cathode 120 and the electrolyte 130, a barrier/insulation film 170 with a via or opening 180 therein exposing the ACC 140, and a conductive redistribution layer 185 in the via or opening 180 and on the barrier/insulation film 170. The moat 150 surrounds the ACC 140. The barrier/insulation film 170 encapsulates CCC/substrate 110 and any barrier thereon, the cathode 120, the electrolyte 130, and the ACC 140. The barrier/insulation film 170 is also in the moat 150. The redistribution layer 185 is also on a first sidewall (the "ACC edge" 145*a-d*) of the cell. A layer of epoxy or other adhesive 195 may be between adjacent cells in the stack, and a dummy cell 210 (e.g., an encapsulated or passivated metal/metal alloy foil) may be on the top of the stack. The battery 250 also includes first and second terminals on opposite sides or edges (e.g., the ACC and CCC edges 145 and 125) of the stack, electrically connected to each ACC 140 (e.g., through the redistribution layer 185) on the first side and to each CCC 110 on the second, opposite side.

In some embodiments, a thin stainless-steel (SS) substrate 110 serves as the cathode current collector. In such embodiments, there is no need for a separate CCC layer, which consumes space in the battery 250 and increases complexity of the method of making the battery. SS is mechanically strong, and therefore, its thickness can be minimized (e.g., to 3-50 μm) to maximize cell energy density. The substrate 110 can be further encapsulated by a barrier metal 115*a-b* to suppress diffusion between the substrate and the cathode 120 (as well as any overlying layer).

In some embodiments, the present battery 250 includes an anode-free ACC 140, which may be defined with minimal pull-back from the cell edges. This design also maximizes area utilization. Furthermore, the use of underlying blanket cathodes 120 and solid-state electrolytes 130 result in a flat or planar ACC over the other battery layers, which minimizes mechanical stresses from Li plating and/or stripping during cell cycling.

The present solid-state battery and method protect the cell(s) from ambient ingress by formation of a moat around the active region, encapsulation of top/bottom/sides of the cell(s) with an ambient-resistant barrier, and capping the sides with a conductive epoxy and plated metal(s) to form externally-facing electrical terminals and further retard ambient ingress. A via and redistribution layer connect the ACC to one of the external electrical terminals. The present solid-state battery and method have the following advantages and differentiation(s):

- No ceramic substrate, which removes the need for an additional CCC layer.
- In some embodiments, no patterned active battery layers, which improves total active area (charge capacity) and area efficiency, decreases process complexity, and eliminates potentially challenging topographies.
- A stacked, multi-cell architecture, vs. others' single-cell batteries, which increases charge density (per unit area of the battery) and battery lifetime.
- The via/opening, redistribution layer, cell stack, and plated epoxy terminals enable a packaged battery with ganged electrical termination.

CONCLUSION

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

The invention claimed is:

1. A solid-state battery comprising:

a plurality of cells; and first and second terminals on first and second sides or edges of the solid-state battery, the first and second sides or edges being opposite from each other, wherein:

each of the plurality of cells comprises:

a cathode current collector (CCC), a cathode on the cathode current collector, a solid-state electrolyte on the cathode, an anode current collector (ACC) on the solid-state electrolyte, a moat in the cathode and the solid-state electrolyte, and around the ACC, a barrier and/or insulation film encapsulating the CCC, the cathode, the solid-state electrolyte, and the ACC, a via or opening in the barrier and/or insulation film exposing the ACC, and a conductive redistribution layer in the via or opening, in the moat, on the barrier and/or insulation film, and on a first sidewall of each of the plurality of cells, one of the first and second terminals on one of the first and second sides or edges of the solid-state battery is electrically connected to the ACC through the conductive redistribution layer on the first sidewall of each of the plurality of cells, and another one of the first and second terminals is electrically connected to the cathode or the CCC of each of the plurality of cells on another one of the first and second sides or edges of the solid-state battery.

2. The solid-state battery of claim 1, wherein the CCC comprises a metal foil, sheet or film.

3. The solid-state battery of claim 2, wherein:

the CCC comprises the metal foil, and the solid-state battery further comprises first and second barriers on opposite major surfaces of the metal foil, and the first and second barriers have a thickness effective to prevent migration of atoms or ions from the metal foil into overlying layers.

4. The solid-state battery of claim 1, wherein the cathode comprises a lithium metal oxide or lithium metal phosphate.

5. The solid-state battery of claim 1, wherein the solid-state electrolyte comprises a lithium phosphorus oxynitride (LiPON).

6. The solid-state battery of claim 1, wherein the ACC comprises a conductive metal or graphite.

7. The solid-state battery of claim 1, wherein the moat comprises a cut through the cathode and the solid-state electrolyte.

8. The solid-state battery of claim 1, wherein the barrier and/or insulation film comprises a polyolefin.

9. The solid-state battery of claim 1, wherein the conductive redistribution layer comprises an air-and/or water-stable metal.

10. The solid-state battery of claim 1, wherein the first and second terminals comprise a conductive epoxy.

11. The solid-state battery of claim 1, wherein the first and second terminals comprise a noble metal selected from the group consisting of Au, Pt, Pd, and Cu.

12. The solid-state battery of claim 1, further comprising a dummy cell on an uppermost surface of a stack of the plurality of cells.

13. The solid-state battery of claim 1, wherein each of the plurality of cells is an anode-less cell that lacks a separately formed lithium anode between the solid-state electrolyte and the anode current collector prior to initial cycling.

14. The solid-state battery of claim 2, wherein the metal foil, sheet, or film forms a mechanical substrate supporting the cathode, the solid-state electrolyte, and the anode current collector of a corresponding one of the plurality of cells.

15. The solid-state battery of claim 2, wherein the metal foil, sheet, or film has a thickness of 3-50 micrometers.

16. The solid-state battery of claim 2, wherein the metal foil, sheet, or film comprises stainless steel.

17. The solid-state battery of claim 3, wherein each of the first and second barriers has a total thickness of 0.5-3 micrometers.

18. The solid-state battery of claim 3, wherein at least one of the first and second barriers comprises a conductive amorphous material.

19. The solid-state battery of claim 1, wherein the conductive redistribution layer covers the via or opening and forms an ambient-ingress barrier over the via or opening.

20. The solid-state battery of claim 1, further comprising adhesive layers between adjacent cells of the plurality of cells.

* * * * *